United States Patent
Perkins et al.

(10) Patent No.: US 6,830,530 B2
(45) Date of Patent: Dec. 14, 2004

(54) TORQUE BIASING PLANETARY DIFFERENTIAL

(75) Inventors: William P. Perkins, Dearborn, MI (US); Perry E. Phelan, Harsens Island, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 14 days.

(21) Appl. No.: 10/254,387

(22) Filed: Sep. 25, 2002

(65) Prior Publication Data

US 2004/0058774 A1 Mar. 25, 2004

(51) Int. Cl.$^7$ .............................................. F16H 48/06
(52) U.S. Cl. ..................................... 475/231; 475/249
(58) Field of Search ................................ 475/221, 223, 475/224, 248, 249, 231, 237, 238, 239, 252

(56) References Cited

U.S. PATENT DOCUMENTS

| | | | |
|---|---|---|---|
| 3,690,426 A | * | 9/1972 | Weisgerber .................. 192/221 |
| 3,866,490 A | | 2/1975 | Orshansky, Jr. |
| 4,412,459 A | | 11/1983 | Goscenski, Jr. |
| 4,471,669 A | | 9/1984 | Seaberg |
| 4,641,548 A | | 2/1987 | Greenwood |
| 4,700,589 A | | 10/1987 | Coronel |
| 4,738,161 A | | 4/1988 | Ivy |
| 4,973,296 A | | 11/1990 | Shibahata |
| 5,135,071 A | | 8/1992 | Shibahata et al. |
| 5,156,578 A | * | 10/1992 | Hirota ......................... 475/150 |
| 5,176,590 A | * | 1/1993 | Haydock ...................... 475/249 |
| 5,209,707 A | * | 5/1993 | Teraoka ....................... 475/249 |
| 5,263,905 A | | 11/1993 | Van Dest |
| 5,370,588 A | | 12/1994 | Sawase et al. |
| 5,390,751 A | | 2/1995 | Puetz et al. |
| 5,536,219 A | | 7/1996 | Umemoto et al. |
| 5,558,590 A | | 9/1996 | Okada et al. |
| 5,569,109 A | | 10/1996 | Okada |
| 5,871,413 A | | 2/1999 | Tar et al. |
| 5,904,634 A | | 5/1999 | Teraoka |
| 5,910,064 A | | 6/1999 | Kuroki |
| 6,013,004 A | * | 1/2000 | Gage et al. .................. 475/249 |
| 6,120,407 A | | 9/2000 | Mimura |
| 6,206,798 B1 | | 3/2001 | Johnson |
| 6,402,656 B1 | * | 6/2002 | Peralta ........................ 475/252 |

FOREIGN PATENT DOCUMENTS

| | | |
|---|---|---|
| DE | 40 22 839 A1 | 1/1992 |
| EP | 0356401 A2 * | 2/1990 |
| GB | 2 233 942 A | 1/1991 |
| GB | 2 251 317 A | 7/1992 |
| GB | 2 299 836 A | 10/1996 |
| GB | 2 321 287 A | 7/1998 |
| WO | WO 86/02420 | 4/1986 |

OTHER PUBLICATIONS

UK Combined Search and Examination Report dated Feb. 13, 2004 for Application No. GB 0319722.5 (4 pages).

* cited by examiner

Primary Examiner—Roger Pang
(74) Attorney, Agent, or Firm—Dickinson Wright PLLC

(57) ABSTRACT

A torque biasing differential including a planetary case rotatable about an axis, a first output shaft rotatable relative to the planetary case, a second output shaft rotatable relative to the planetary case and the first output shaft, and a planetary assembly coupling the planetary case to the first and second output shafts. The planetary assembly includes first and second intermeshed inboard planet gears. The differential also include torque sinks associated with each of the first and second planetary assemblies to selectively distribute torque between the output shafts and control relative shaft rotation. The various embodiments of the torque biasing differential also describe alternative planetary differential configurations relating to the structure, orientation, and interaction of the sun gears, planet gears, and case.

10 Claims, 3 Drawing Sheets

TORQUE BIASING PLANETARY DIFFERENTIAL

BACKGROUND OF THE INVENTION

The present invention is directed to a torque biasing differential for distributing torque from an input drive to first and second output shafts and, more particularly, to a torque biasing differential having coupled and compound planetary gear sets.

Torque biasing differentials are used to bias torque between driven shafts, such as axle half-shafts, in a variety of motor driven vehicles including wheel-driven automobiles and trucks, track-laying vehicles such at tanks, off-road vehicles with paired-wheel steering, and boats with twin propellers. Selectively biasing drive torque between the shafts enhances vehicle performance such as by providing steering augmentation and control of wheel slip in low traction environments. Many conventional torque biasing differentials include bevel gears in combination with planetary gear sets and torque sinks for controlling the distribution of torque. Despite the recognition in the art of the benefits of differential movement of driven shafts and the general benefits of planetary gear sets in such systems, there remains an unfulfilled need for a torque biasing differential that provides the controllable variation of speed and torque between the driven shafts in a concentric configuration that enhances packaging and minimizes the size and weight of the differential.

SUMMARY OF THE INVENTION

In view of the above, the present invention is directed to a torque biasing differential including a planetary case rotatable about an axis, a first output shaft rotatable relative to the planetary case, a second output shaft rotatable relative to the planetary case and the first output shaft, and a planetary assembly coupling the planetary case to the first and second output shafts. The planetary assembly includes first and second intermeshed inboard planet gears. The differential also include torque sinks associated with each of the first and second planetary assemblies to selectively distribute torque between the output shafts and control relative shaft rotation. The various embodiments of the torque biasing differential also describe alternative planetary differential configurations relating to the structure, orientation, and interaction of the sun gears, planet gears, and case.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
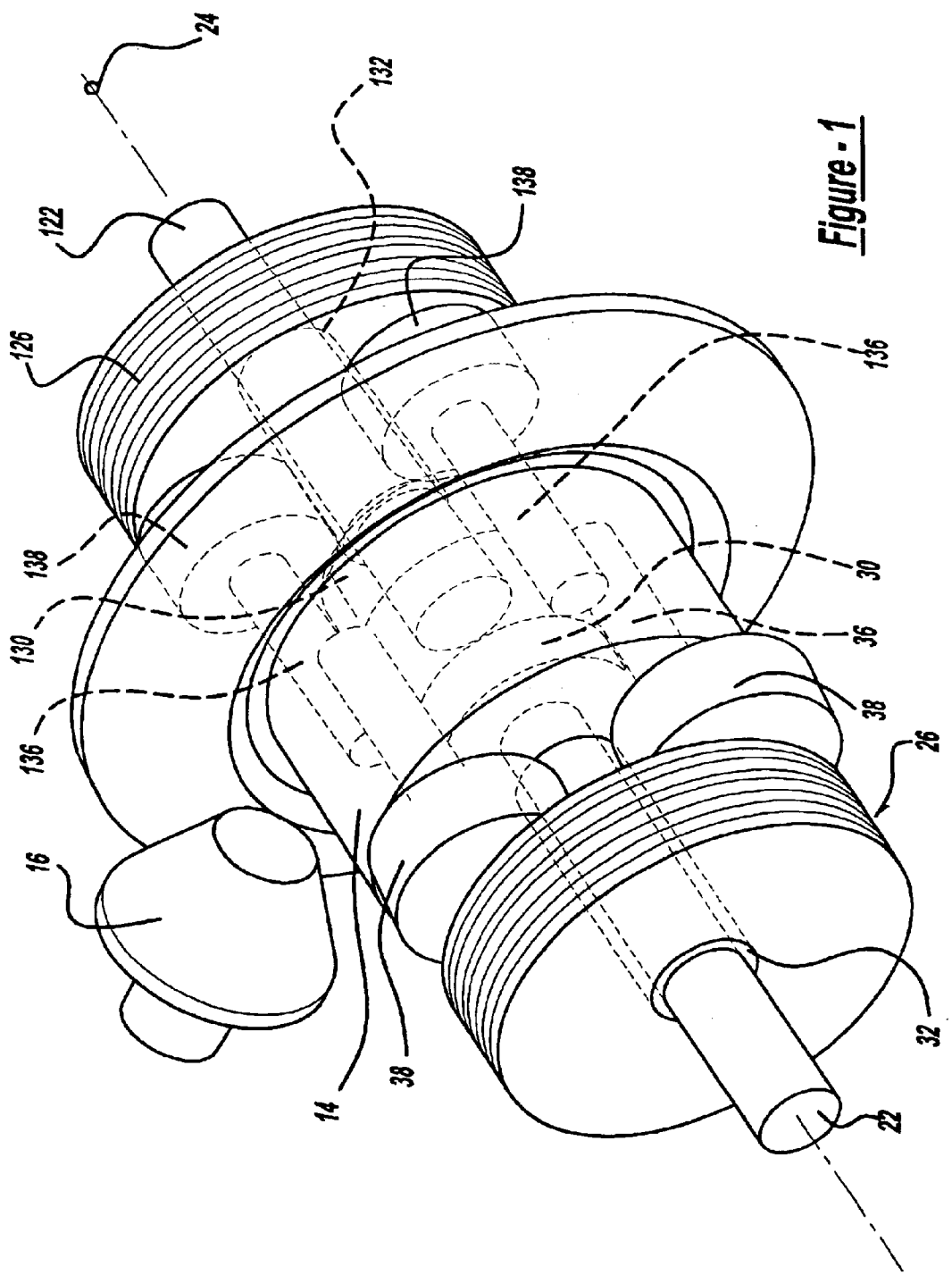
FIG. 1 is a perspective view of the torque biasing differential of the present invention.
Figure 2:
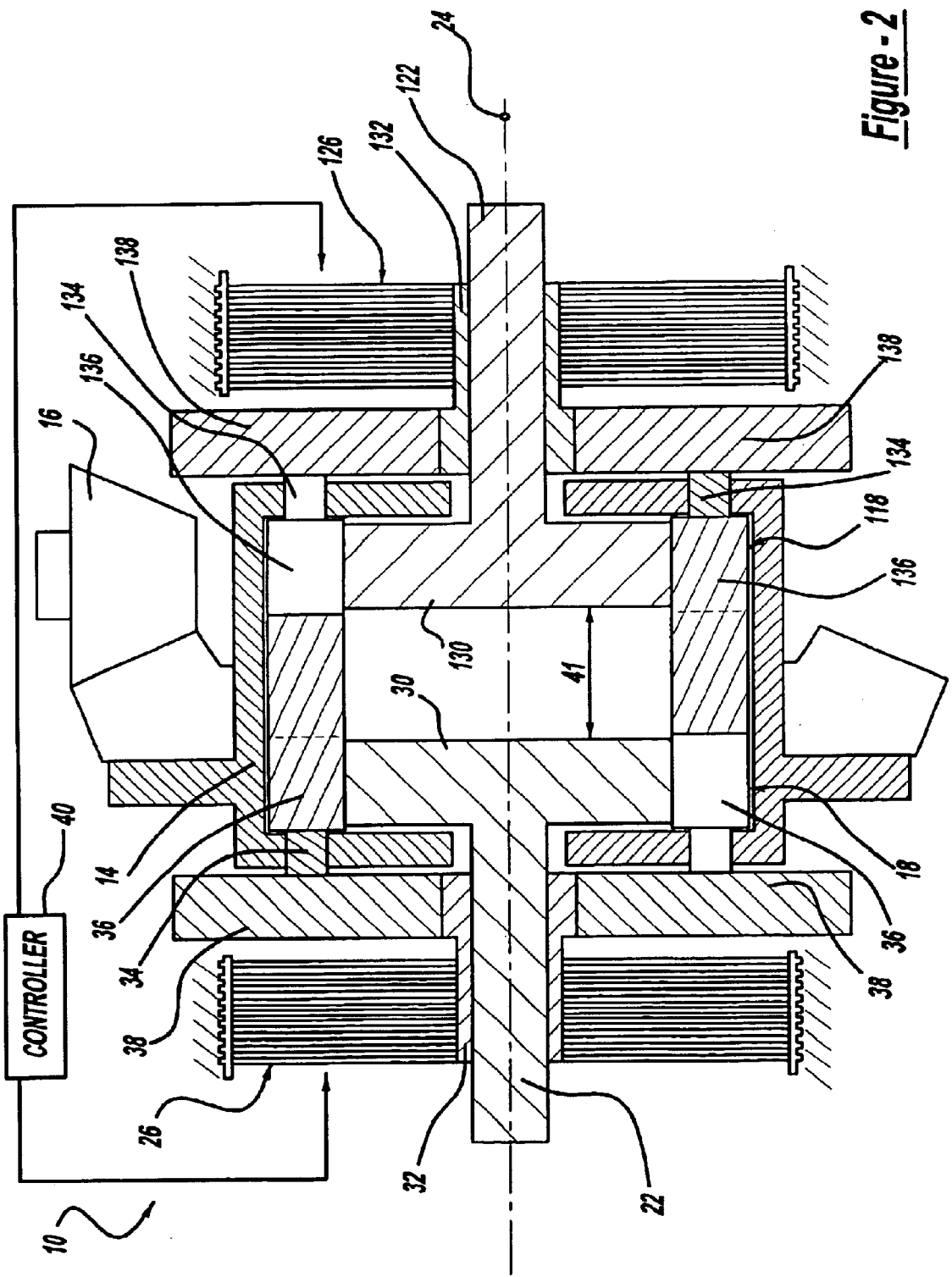
FIG. 2 is an axial cross sectional view of the torque biasing differential shown in FIG. 1.

FIGS. 1 and 2 illustrate a torque biasing differential 10 having a planetary case 14 rotatably driven by an engine driven component 16 (such as the illustrated hypoid gear), first and second coupled and compound planetary gear sets 18 and 118 operably coupling first and second output shafts 22 and 122 to the case 14. The first and second output shafts 22 and 122 are each rotatable relative to the case 14 about an axis 24 with the first and second compound planetary gear sets 18 and 118 capable of driving the output shafts at different rotational speeds based upon the controlled condition of torque sinks 26 and 126.

As will be described in greater detail below, the torque biasing differential 10 provides the functional benefits of conventional torque biasing arrangements, including biasing torque between the half-shafts in a controllable manner. Moreover, the configuration of the torque biasing differential 10 of the present invention further provides numerous advantages over conventional systems including, but not limited to, concentric gear and shaft packing that reduces the space and weight of the differential and eliminates the need for a traditional bevel differential.

The components and operation of the first compound planetary gear set 18 will now be described in detail with reference to FIGS. 1 and 2. It should be appreciated that the second compound planetary gear set 118 has components and an arrangement similar to the first compound planetary gear set 18. For ease of reference, the corresponding components of the second compound planetary gear set 118 are identified in the drawings by reference numerals increased by one hundred.

The first compound planetary gear set 18 includes an inboard sun gear 30, an outboard sun gear 32, planet carrier shafts 34 coupled to rotate about axis 24 with the case 14 (functioning as the planet carrier) and about their shaft axes relative to the case, and inboard and outboard planet gears 36 and 38 each mounted on and rotating with the planet carrier shafts 34. The inboard sun gear 30 is splined or otherwise fixed to rotate with the first output shaft 22 and meshed with the inboard planet gears 36. The outboard planet gears 38 are meshed with the outboard sun gear 32. The first and second inboard planet gears 38 and 138 are also intermeshed, such as in the axial gap 41 between the inboard sun gears 30 and 130.

The torque sink 26 may be of any conventional type and is controllable in a known manner to selectively vary the rotational resistance provided by the outboard sun gear 32. For example, the torque sink may consist of a wet or dry frictional clutch pack, a hydraulic torque control arrangement (such as hydraulic pumps or motors), or electrical mechanisms. A variety of torque sink actuators, including actively or passively controllable electronic, hydraulic, or mechanical actuators may be used with the present invention. The differential 10 of the present invention may be actively controlled thereby permitting communication of different torque levels to the first and second output shafts without the need for a pre-existing rotational speed differential, e.g., wheel slip. By way of example, a controller 40 may be used to control the operative condition of the torque sink 26. Commonly used controllers receive input from a variety of sensors (e.g., wheel speed, steering wheel angle, brake pedal position, accelerator position, and yaw) that indicate vehicle performance and use conventional control techniques to generate actuation signals to adjust the torque sink between a fully engaged condition wherein the outboard sun gear 32 is rotationally fixed and a fully disengaged condition wherein the outboard sun gear is freely rotatable.

During "normal" operation, i.e., straight line driving with adequate wheel traction, the torque biasing differential 10 operates in the following manner to distribute torque equally between the first and second output shafts 22 and 122. First, the torque sinks 26 and 126 are in their fully disengaged conditions permitting the outboard sun gears 32 and 132 to rotate freely about shafts 22 and 122, respectively. Thus, the torque delivered from the engine driven component 16 to the case 14 is transmitted to the inboard planet-gears 36 and 136 by the planet carrier shafts 34 and 134 rotating with the case about axis 24. The inboard sun gears 30 and 130, meshed with and driven by the respective inboard planet gears 36 and 136, are fixed to rotate with their respective output shafts 22 and 122, and cause output shafts 22 and 122 to spin at the rotational speed of the differential case 14, each receiving fifty percent (50%) of driveline torque. The outboard planet gears 38 and 138 cause the outboard sun gears 32 and 132 to also rotate at the same speed as the differential case 14 resulting in a delta-speed across the torque sinks 26 and 126 equal to the speed of the differential case 14.

The delta-speed across the torque sinks 26 and 126 permit control over the torque distribution between the output shafts. Those skilled in the art will appreciate that it is desirable to distribute different torque to the first and second output shafts 22 and 122 in a variety of circumstances. For example, torque distribution can provide primary steering control in tracked and propeller driven vehicles as well as steering augmentation in commercially available wheeled vehicles. In a steering assist condition, the inboard sun gears 30 and 130 and inboard planet gears 36 and 136 function in a manner similar to a traditional bevel-gear differential to permit rotation of the first and second output shafts at different speeds while still receiving driveline torque.

When the vehicle is traversing a left hand turn it is desirable to rotate the left hand (i.e., first) output shaft 22 slower than the right hand (i.e., second) output shaft 122. In this instance, the controller 40 engages the first torque sink 26 forcing the first inboard sun gear 30 and first output shaft 22 to slow down and the second output shaft 122 to rotate faster. Specifically, engagement of the first torque sink 26 slows the first outboard sun gear 32 and, given the instantaneously constant rotational speed of the case 14, causes the first outboard planet gears 38, rigidly connected to the planet carrier shafts 34 and inboard planet gears 36, to rotate faster about their respective carrier shaft axes, but orbit slower about the case axis 24. The inboard planet gears 36, spinning at the same speed as the outboard planet gears 38 and shafts 34, also increase in rotational speed. Because of the relative gear sizing, the first inboard sun gear 30 and first output shaft 22 slow down relative to the rotation of the case 14. The first inboard planet gears 36, now rotating faster than under "normal" operation, are meshed with and drive the second inboard planet gears 136 to rotate faster, but in the opposite direction. As the second torque sink 126 remains in its disengaged condition, the second outboard sun gear 132 freely rotates and the second inboard planet gears 136, spinning as fast as the first inboard planet gears 36 but in the opposite direction, drive the second inboard sun gear 130 and second output shaft 122 faster than the case 14.

A similar control strategy may be used to limit wheel slip in a wheeled vehicle. For example, when a driven wheel of an automobile encounters a low traction surface, such as ice or gravel, the wheel tends to lose traction and slip. If the wheel driven by the first output shaft 22 (e.g., left side wheel) were to encounter such a condition, the wheel slip may be controlled by engaging the first torque sink 26 to slow the output shaft 22 and transfer torque to second output shaft 122.

Those skilled in the art will appreciate that steering assist in right hand turns and countering wheel slip of the second output shaft 122 may be achieved in the torque biasing differential 10 by engaging the second torque sink 126. Thus, the control system can engage either the first or second torque sinks to variably increase or decrease the speed and torque delivered to each output shaft. In order to ensure smooth operation of the differential 10, only one of the first and second torque sinks 26 and 126 should be engaged at a time.

Further modifications to the embodiment illustrated in FIGS. 1 and 2 will be apparent to those skilled in the art if it is desired to alter the operation of the differential. For example, the embodiment illustrated in FIGS. 1 and 2 shows the outboard planet gears 38, 138 having a larger diameter than the outboard sun gears 32, 132 and the inboard planet gears 36, 136 having a smaller diameter than the inboard sun gears 30, 130 in order to achieve the relative rotational speeds described above. The respective sizes of these elements may be altered to achieve different reduction magnitudes. For example, if the size of these respective elements were changed such that the outboard planet gears 38, 138 are the same size as the inboard planet gears 36, 136 and the outboard sun gears 32, 132 are the same size as the inboard sun gears 30, 130, then actuation of the first torque sink 26 would slow the first output shaft 22 to zero speed and increase the speed of the second output shaft 122 to twice case 14 speed. As another example, if the size of these respective elements were changed such that the outboard planet gears 38, 138 are smaller than the outboard sun gears 32, 132 and the inboard planets 36, 136 larger than the inboard suns 30, 130, actuation of the first torque sink 26 would make the first output shaft 22 spin in the opposite direction of the case 14, and actuation of the second torque sink 126 would likewise make the second output shaft 122 spin in the opposite direction of the case 14.

From the above description and the illustrations of FIGS. 1 and 2, those skilled in the art will appreciate that the torque biasing differential 10 not only achieves the operational benefits of conventional torque biasing systems but also provides numerous advantages over such systems. For example, the torque biasing differential 10 permits the transmission of differing torque to the first and second output shafts to provide steering control and counteract slip conditions without requiring a traditional bevel-gear arrangement. Moreover, the configuration of the compound and coupled planetary gear sets provide concentric gear and shaft packaging. Further, where the torque sinks 26 and 126 are dry torque sinks, such as the illustrated dry clutch packs, the low viscosity of the air between the clutch plates reduces the viscous drag forces within the clutch-pack, thereby providing negligible torque sink drag when the torque sink is fully disengaged. The invention also achieves simplicity and weight savings by eliminating the need for a ring gear meshed with the inboard and outboard planet gears 36 and 136.

Figure 3:
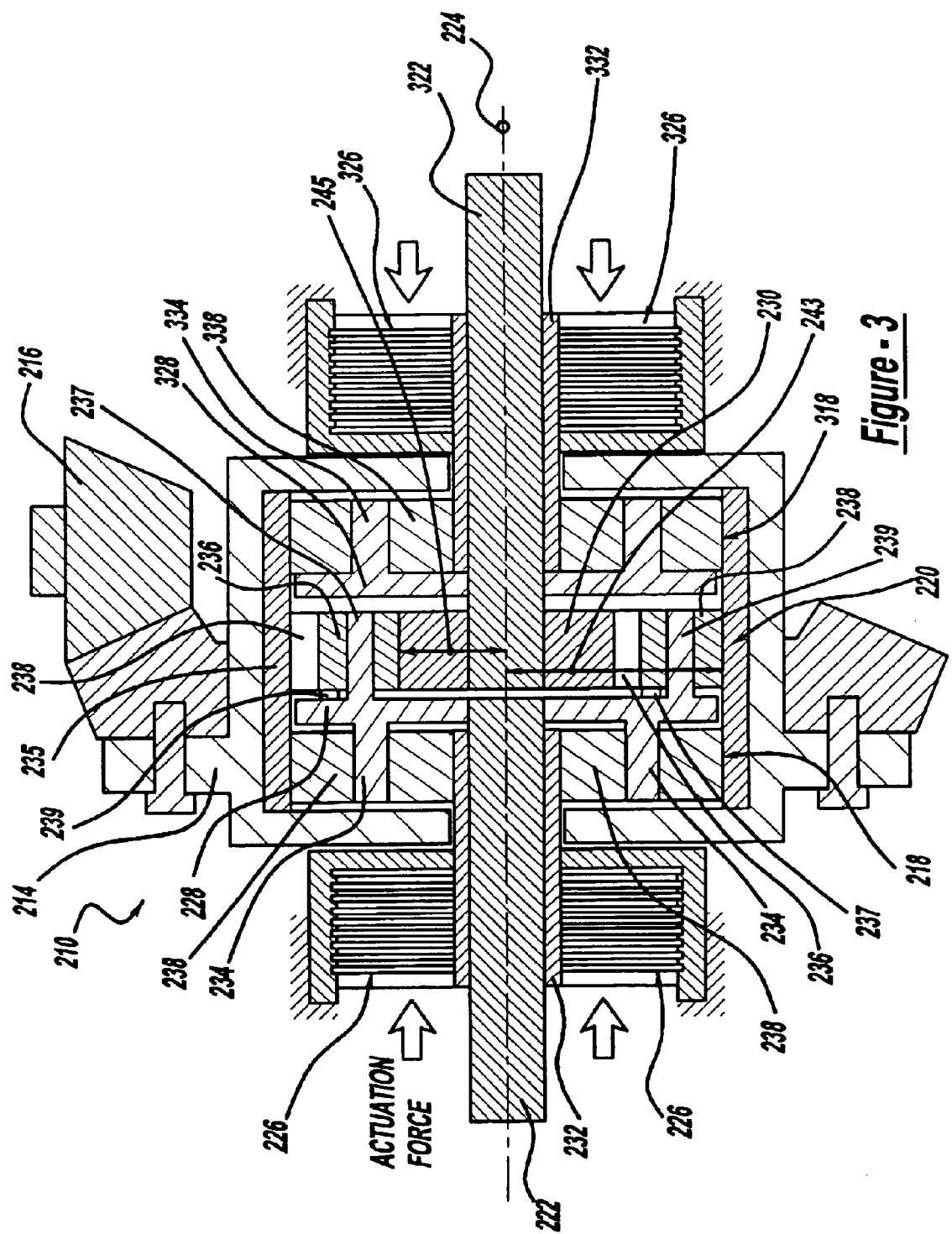
FIG. 3 is an axial cross sectional view of another embodiment of the torque biasing differential of the present invention.

A further embodiment of the torque biasing differential of the present invention is illustrated in FIG. 3. This torque biasing differential 210 is a kinematic equivalent of the differential described above with reference to FIGS. 1 and 2 and will indicate to those skilled in the art that various other modifications may be made to the embodiments described herein without departing from the scope of the invention defined by the appended claims. For the sake of consistency, components of the torque biasing differential 210 that are similar in structure or function to those of the torque biasing differential 10 of FIGS. 1 and 2 are indicated by reference numerals increased by two hundred.

As is illustrated in FIG. 3, the torque biasing differential 210 includes a planetary differential 220 and first and second planetary gear sets 218 and 318 generally disposed within a planetary case 214. The planetary differential 220 functions in a manner similar to a traditional differential, such as a bevel gear differential, to permit the first and second output shafts 222 and 322 to rotate relative to one another. The first and second planetary gear sets 218 and 318 communicate drive torque from the engine drive component 216 and case 214 to the first and second output shafts 222 and 322. The magnitude of the transferred torque is dependent upon the input torque and the engagement state of the torque sinks 226 and 326.

The first and second planetary gear sets 218 and 318 each include an outboard sun gear 232, 332 rotatable relate to their respective output shafts 222 and 322, a planet carrier 228, 328 fixed to rotate with the output shaft 222, 322, planet gears 238, 338 mounted for rotation on carrier shafts 234, 334, and a ring gear 235 fixed to rotate with the case 214. The planet gears 238, 338 are meshed with the outboard sun gear 232, 332 and the ring gear 235. Just as in the embodiment illustrated in FIGS. 1 and 2, the outboard sun gears 232 and 332 include clutch components, such as the illustrated clutch pack plates, whereby the rotation of the sun gears is controllable by the torque sinks 226, 326.

The planetary differential 220 includes a sun gear 230 fixed to rotate with one of the output shafts (e.g., shaft 322 in FIG. 3), inner planet gears 236 rotatably mounted on inner carrier shafts 237 and meshed with the sun gear 230, and outer planet gears 238 rotatably mounted on outer carrier shafts 239 and meshed with the ring gear 235. The inner planet gears 236 and 238 are intermeshed with one another and their respective inner carrier shafts 237 and 239 rotate with the carrier 228, which is fixed to the output shaft that is not attached to sun gear 230 (e.g., shaft 222 in FIG. 3).

In operation, drive torque is transmitted from the driven case 214 and ring gear 235 to the output shafts 222 and 322 via the planet gears 238, 338 and carriers 228, 328. During "normal" operation, where the vehicle is moving in a straight path with adequate traction and the torque sinks 226, 326 are disengaged, the output shafts 222, 322 as well as the outboard sun gears 232, 332 rotate at the same speed as the case 214 and the delta-speeds in the torque sinks are equal to the case speed. In order to distribute torque equally between the first and second output shafts 222 and 322, the distance 243 from the axis 224 to the inner surface of the ring gear 235 is twice the distance 245 from the axis 224 to the outer surface of the inboard sun gear 230.

Engagement of one of the torque sinks 226 or 326 causes the corresponding output shaft 222 or 322 to slow and the other output shaft 322 or 222 to increase in speed. For example, assuming the ring gear 235 rotates at a constant speed, actuation of the first torque sink 226 slows the rotation of the outboard sun gear 232 thereby increasing the rotational speed of planet gears 238 about the carrier shafts 234, decreasing the rotational speed of the carrier 228 about axis 224, and decreasing the speed of the output shaft 222 rotating with the carrier 228. The slower rotating carrier 228 causes the inner planet gears 236 of the planetary differential 220 to rotate faster about their respective shaft axes and, in turn, to rotate the inboard sun gear 230 and second output shaft 322 faster than the case 214. It should be appreciated that slowing the first shaft 222 and increasing the rotational speed of the second shaft 322 through actuation of the first torque sink 226 is effective for steering assist in left hand turns and to counteract left wheel slip. Actuation of the second torque sink 326 is similarly effective for steering assist in right hand turns and to counteract right wheel slip.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A torque biasing differential comprising:
    a planetary case rotatable about an axis;
    a first output shaft rotatable relative to the planetary case;
    a second output shaft rotatable relative to the planetary case and the first output shaft;
    a planetary assembly including a first planetary gear assembly coupling said planetary case to said first output shaft, a second planetary gear assembly coupling said planetary case to said second output shaft, a first inboard planet gear and a second inboard planet gear meshed with said first inboard planet gear;
    a first torque sink operably associated with said first planetary gear assembly and a second torque sink operably associated with said second planetary gear assembly; and
    a torque controller communicating with said first and second torque sinks to selectively place said first and second torque sinks in an engaged or disengaged condition.

2. The torque biasing differential of claim 1 wherein placement of said first torque sink in said engaged condition causes said first output shaft to rotate slower than said planetary case and said second output shaft to rotate faster than said planetary case.

3. The torque biasing differential of claim 1 wherein said first planetary gear assembly includes a first outboard sun gear, said first torque sink having a first torque sink component coupled to rotate with said first outboard sun gear and a second torque sink component that is stationary.

4. The torque biasing differential of claim 3 wherein said second planetary gear assembly includes a second outboard sun gear, said second torque sink having a first torque sink component coupled to rotate with said second outboard sun gear and a second torque sink component that is stationary.

5. The torque biasing differential of claim 4
    wherein said first planetary gear assembly includes
        said first inboard planet gear,
        a first inboard sun gear fixed to rotate with the first output shaft,
        a first planet carrier rotatable with said planetary case, and
        a first outboard planet gear fixed to rotate with the first planet carrier;
    wherein said first inboard planet gear is fixed to rotate with the first planet carrier and is meshed with the first inboard sun gear;
    wherein said first outboard sun gear is rotatable relative to the first output shaft and is meshed with the first outboard planet gear;
    wherein said second planetary gear assembly includes said second inboard planet gear,
   a second inboard sun gear fixed to rotate with the second output shaft,
   a second planet carrier rotatable with said planetary case, and
   a second outboard planet gear fixed to rotate with the second planet carrier;
wherein said second inboard planet gear is fixed to rotate with the second planet carrier and is meshed with the second inboard sun gear; and
wherein said second outboard sun gear is rotatable relative to the second output shaft and is meshed with the second outboard planet gear.

6. A torque biasing differential comprising:
a planetary case rotatable about an axis;
an input shaft;
a first output shaft rotatable relative to said planetary case;
a second output shaft rotatable relative to said planetary case and said first output shaft;
a planetary assembly including a first planetary gear assembly coupling said planetary case to a first output shaft and a second planetary gear assembly coupling said planetary case to a second output shaft, and wherein said planetary assembly includes a first inboard planet gear and a second inboard planet gear meshed with paid first inboard planet gear;
a first sun gear fixed to rotate with said first output shaft;
a first torque sink operably coupled to said first sun gear; and
a torque controller operably coupled to said first torque sink to control rotation of said first sun gear, said torque controller capable of controlling the rotation of said first sun gear independent of said input shaft, wherein said first torque sink is operably associated with said first planetary gear assembly and wherein said torque biasing differential further includes a second torque sink operably associated with said second planetary gear assembly.

7. A torque biasing differential comprising;
a planetary case rotatable about an axis;
a first output shaft rotatable relative to the planetary case;
a second output shaft rotatable relative to the planetary case and the first output shaft;
a first planetary gear assembly including
   a first inboard sun gear fixed to rotate with the first output shaft,
   a first planet carrier shaft rotatable with said planetary case,
   a first inboard planet gear fixed to rotate with the first planet carrier and meshed with the first inboard sun gear, and
   a first outboard planet gear fixed to rotate with the first planet carrier;
a second planetary gear assembly including
   a second inboard sun gear fixed to rotate with the second output shaft,
   a second planet carrier rotatable with said planetary case,
   a second inboard planet gear fixed to rotate with the second planet carrier and meshed with the second inboard sun gear, and
   a second outboard planet gear fixed to rotate with the second planet carrier;
wherein said first outboard sun gear is rotatable relative to the first output shaft and meshed with the first outboard planet gear; and
wherein said second outboard sun gear is rotatable relative to the second output shaft and meshed with the second outboard planet gear.

8. The torque biasing differential of claim 7 wherein said torque biasing differential further includes a first torque sink operably associated with said first planetary gear assembly and a second torque sink operably associated with said second planetary gear assembly and wherein said torque biasing differential further includes a torque controller communicating with said first and second torque sinks to selectively place said first and second torque sinks in an engaged or disengaged condition.

9. The torque biasing differential of claim 8 wherein said first planetary gear assembly includes a first outboard sun gear, said first torque sink having a torque sink component coupled to rotate with said first outboard sun gear.

10. The torque biasing differential of claim 9 wherein said second planetary gear assembly includes a second outboard sun gear, said second torque sink having a torque sink component coupled to rotate with said second outboard sun gear.

* * * * *

UNITED STATES PATENT AND TRADEMARK OFFICE
CERTIFICATE OF CORRECTION

PATENT NO. : 6,830,530 B2
DATED : December 14, 2004
INVENTOR(S) : William P. Perkins et al.

It is certified that error appears in the above-identified patent and that said Letters Patent is hereby corrected as shown below:

Column 7,
Line 26, "paid" should be -- said --.

Signed and Sealed this

First Day of March, 2005

JON W. DUDAS
*Director of the United States Patent and Trademark Office*